United States Patent
Wakazono

(10) Patent No.: US 6,575,813 B2
(45) Date of Patent: Jun. 10, 2003

(54) GUIDING APPARATUS FOR A SLIDABLE MEMBER DRIVEN BY A LINEAR MOTOR

(75) Inventor: Yoshio Wakazono, Nagoya (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 0 days.

(21) Appl. No.: 09/760,850

(22) Filed: Jan. 17, 2001

(65) Prior Publication Data

US 2003/0036336 A1 Feb. 20, 2003

(30) Foreign Application Priority Data

Jan. 17, 2000 (JP) ........................................ 2000-007871

(51) Int. Cl.[7] .............................................. B24B 49/00
(52) U.S. Cl. ............................ 451/11; 451/150; 310/12
(58) Field of Search ................................. 451/9, 10, 11, 451/28, 62, 213, 215, 218, 137, 150, 152, 156, 157, 166, 397, 398, 399; 310/12

(56) References Cited

U.S. PATENT DOCUMENTS

| | | | |
|---|---|---|---|
| 4,841,869 A | * | 6/1989 | Takeuchi et al. ............ 104/292 |
| 4,904,153 A | * | 2/1990 | Iwasawa et al. ............ 414/735 |
| 5,791,971 A | * | 8/1998 | Dickinson et al. ............ 451/11 |
| 6,095,054 A | * | 8/2000 | Kawano et al. ............ 104/139 |
| 6,110,010 A | * | 8/2000 | Pflager et al. ................ 310/12 |
| 6,161,995 A | * | 12/2000 | Wakazono et al. ........... 408/234 |

FOREIGN PATENT DOCUMENTS

| | | | |
|---|---|---|---|
| DE | 43 15818 A1 | 11/1994 | |
| DE | 195 31 507 | 2/1997 | |
| EP | 0 583 087 | 2/1994 | |
| EP | 0 893 196 | 1/1999 | |
| JP | 61209838 | 9/1986 | |
| JP | 64-20944 | 1/1989 | |
| JP | 9-150334 | 6/1997 | |
| JP | 10127036 A | * 5/1998 | ......... H02K/41/025 |
| WO | WO 97/44158 | 11/1997 | |
| WO | WO 98/05473 | 2/1998 | |

\* cited by examiner

Primary Examiner—Joseph J. Hail, III
Assistant Examiner—David B. Thomas
(74) Attorney, Agent, or Firm—Oblon, Spivak, McClelland, Maier & Neustadt, P.C.

(57) ABSTRACT

A grinding head guiding apparatus is disclosed. The grinding head is driven by the linear motor which is constituted of a coil attached on an underside surface of the grinding head and a magnet attached on an upside surface. Horizontal guiding members are fixed on the base, and the grinding head is guided to the horizontal guide members. Then, a height of a portion opposing the coil and the magnet is approximately same as a height of the horizontal guide members guiding the grinding head. Besides, temporary supporting members are attached on the base so as to avoid sticking the coil to the magnet, when the coil is detached from the grinding head. Further, the grinding head has ribs therein, which define an approximately trapezoid-shaped space disposed a center of the grinding head and triangle-shaped spaces disposed both side of the trapezoid-shaped space.

17 Claims, 6 Drawing Sheets

GUIDING APPARATUS FOR A SLIDABLE MEMBER DRIVEN BY A LINEAR MOTOR

INCORPORATION BY REFERENCE

The disclosure of Japanese Patent Application No. 2000-7871 filed on Jan. 17, 2000 is incorporated herein by reference in its entirety.

BACKGROUND OF THE INVENTION

1. Field of the Invention

This invention relates to a guiding apparatus for a slidable member driven by a linear motor, more particularly, to a guiding apparatus for a tool or a workpiece supporting unit used in a machine tool or the like.

2. Description of the Related Art

A grinding head guiding apparatus for a grinding machine has been known by International Patent Publication (PCT) No. WO97/44158 (hereinafter "first related art"). In the first related art, since one linear motor is disposed under the grinding head, magnetic pulling force generated between magnetic coil unit and permanent magnet unit acts on a pair of right and left fixed guiding surfaces downwardly (in a vertical direction). Therefore, both of the magnetic pulling force and weight of the grinding head act on the fixed guiding surfaces. On the other hand, hydrostatic pockets are arranged on a pair of right and left guiding surfaces (hereinafter "grinding head guiding surfaces") which are arranged underside of the grinding head and are opposed to the pair of right and left fixed guiding surfaces each other. And hydrostatic pressure generated by fluid supplied to the hydrostatic pockets makes the grinding head float against the magnetic pulling force and the weight of the grinding head. In such a construction, only upward surfaces of the fixed surfaces serve as the guiding surface to guide the grinding head in the vertical direction. When the hydrostatic pressure generating on the fixed surfaces for floating the grinding head balances with resultant force of the magnetic pulling force and the weight of the grinding head, a vertical position of the grinding head is kept at a desire position.

Japanese Patent Publication No. H09 (1997)-150334 discloses another guiding apparatus (hereinafter "second related art"). In FIG. 4 of the second related art, two linear motors are disposed between a grinding head and a base so that magnetic pulling force is generated in a vertical direction. And a pair of right and left fixed guiding portions having an upward guiding surface and a downward guiding surface each other is constituted. Meanwhile, the grinding head has a pair of right and left upside surfaces being opposed to the downward guiding surfaces of the fixed guiding portions each other, and a pair of right and left underside surfaces being opposed to the upward guiding surfaces of the fixed guiding portions each other. Hydrostatic pockets are arranged on each of the upside surfaces and the underside surfaces of the grinding head, so that a position of the grinding head in the vertical direction is adjusted by hydrostatic pressure generated by fluid of supplied to the hydrostatic pockets.

In the first related art, because the vertical position of the grinding head is kept to balance the hydrostatic pressure with resultant force of the magnetic pulling force and the weight of the grinding head, fluctuation of the grinding force act on the grinding head in the vertical direction makes a vertical position of the grinding head to be precarious. Especially in a case that a non-circular workpiece such as camshaft is ground by a grinding wheel rotatably supported at a front end of the grinding head, it should be considered that large grinding force generating upward and downward alternatively acts on the grinding head through the grinding wheel. Particularly, resultant force of the magnetic pulling force and the weight of the grinding head should be configured to be extremely large quantity relative to the hydrostatic pressure to obtain high rigidity for keeping vertical position of the grinding head. This causes a mechanical contact of the fixed guiding surfaces with grinding head guiding surface, and a lack smooth movement of the grinding head.

Further, since thrust of the linear motor for moving the grinding head acts on the grinding head above the guiding surfaces, moment causing a pitching motion of the grinding head occurs easily in structure of the guiding apparatus of the first related art.

In the second related art, since the grinding head is moved by guiding upward surfaces and downward surfaces of a pair of right and left horizontal guiding members, the problem that is precariousness of the vertical position of the grinding head is solved. However, since a linear motor is disposed at a lower position far than the horizontal guiding members, thrust of the linear motor for moving the grinding head causes easily a pitching motion of the grinding head.

Furthermore, in the first related art, a bearing portion of rotatably supporting a grinding spindle provides on the grinding wheel is disposed at a front end of the grinding head, which portion is overhung from hydrostatic guiding surfaces formed on the underside surface of the grinding head. That is, any hydrostatic guiding surface is not formed at an underside surface portion of the grinding head corresponding to the bearing portion, and the grinding head is moved under a condition that the bearing portion protrudes from a front end of the hydrostatic guiding portion formed at underside surface of the grinding head. In this structure, it occurs easily such a bad influence that causes fluctuation of the grinding force which acts on the grinding head trough the grinding wheel.

Moreover, in a guiding apparatus for guiding a grinding head of a grinding machine disposed a heavy grinding spindle bearing portion at the front end of the grinding head, there are some technical requirements as follows:

(1) To guide the grinding head on the fixed guiding surfaces by uniform supporting force through a whole of the guiding surfaces including underside of the grinding spindle bearing portion, thereby avoiding to concentrate mass of the grinding head on the hydrostatic guiding surface adjacent to the grinding spindle bearing portion;

(2) To design each of hydrostatic pockets disposed to the underside surfaces of the grinding head along the moving direction of the grinding head as equivalent specification, thereby simplifying a pressure oil supplying apparatus for supplying pressure oil to the pockets;

(3) To facilitate for maintenance to detach the magnetic coil unit of the linear motor attached on the underside surface of the grinding head along longitudinal direction thereof for maintenance.

SUMMARY OF THE INVENTION

In view of the foregoing, an object of the present invention is to avoid tilting a slidable member such as a grinding head even if magnetic pulling force of a linear motor acts on a guiding surface, and is to improve rigidity of the guiding surface so as to raise the natural frequency in a pitching direction of the slidable member, whereby high servo gain for controlling the linear motor can be set.

Another object of the present invention is to keep a posture of the slidable member even though force such as machining force acting on the slidable member fluctuates.

The other object of the present invention is to provide a guiding apparatus suited for guiding a grinding head of a grinding machine, which can satisfy at least one of the aforementioned technical requirements.

In order to achieve the above objects, the present invention provides a guiding apparatus for a slidable member driven by a linear motor. The guiding apparatus comprises: a base; a pair of horizontal guide members fixed on the base along a longitudinal direction thereof and guiding a slidable member; a primary consisting a linear motor and attached on an underside surface of the slidable member; and a secondary consisting the linear motor and attached on an upside surface of the base along the longitudinal direction thereof.

According to a first aspect of the present invention, a vertical position of a portion of opposing the primary and the secondary is approximately same as that of a vertical position of the horizontal guide members guiding the slidable member.

Since trust of the linear motor acts on the slidable member at the same vertical position as that of a guiding portion of the horizontal guide members, moment causing a pitching motion of the slidable member does not occur.

According to a second aspect of the present invention, the guiding apparatus further comprises a pair of temporary support members attached on the base of both sides of the secondary along the longitudinal direction thereof, which support the primary so as to avoid the primary sticking to the secondary when the primary is detached from the slidable member.

Since sticking the primary to the secondary is avoided by the temporary support members, the primary is easily detached from the slidable member for maintenance.

According to a third aspect of the present invention, the guiding apparatus comprises a supporting unit attached on a front end of the slidable member, wherein a primary is not attached at an under portion of the supporting unit.

The magnetic pulling force does not act on the slidable member at the under portion attached on the supporting unit on which portion weight of the supporting unit act. Therefore, the slidable member is guided to the horizontal guiding members by uniform supporting force through a whole of the horizontal guide members including the under portion attached on the supporting unit.

According to a forth aspect of the present invention, the slidable member has a pair of ribs extending along the longitudinal direction of the slidable member therein, which define an approximately trapezoid-shaped space disposed at a center of the slidable member in the lateral direction and a pair of triangle-shaped space disposed both sides of the trapezoid-shaped space.

Since the slidable member is consisted trusses formed by the ribs, both of the rigidity and lightweight of the slidable member can be improved.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will be described with reference to the drawings.

Figure 1:
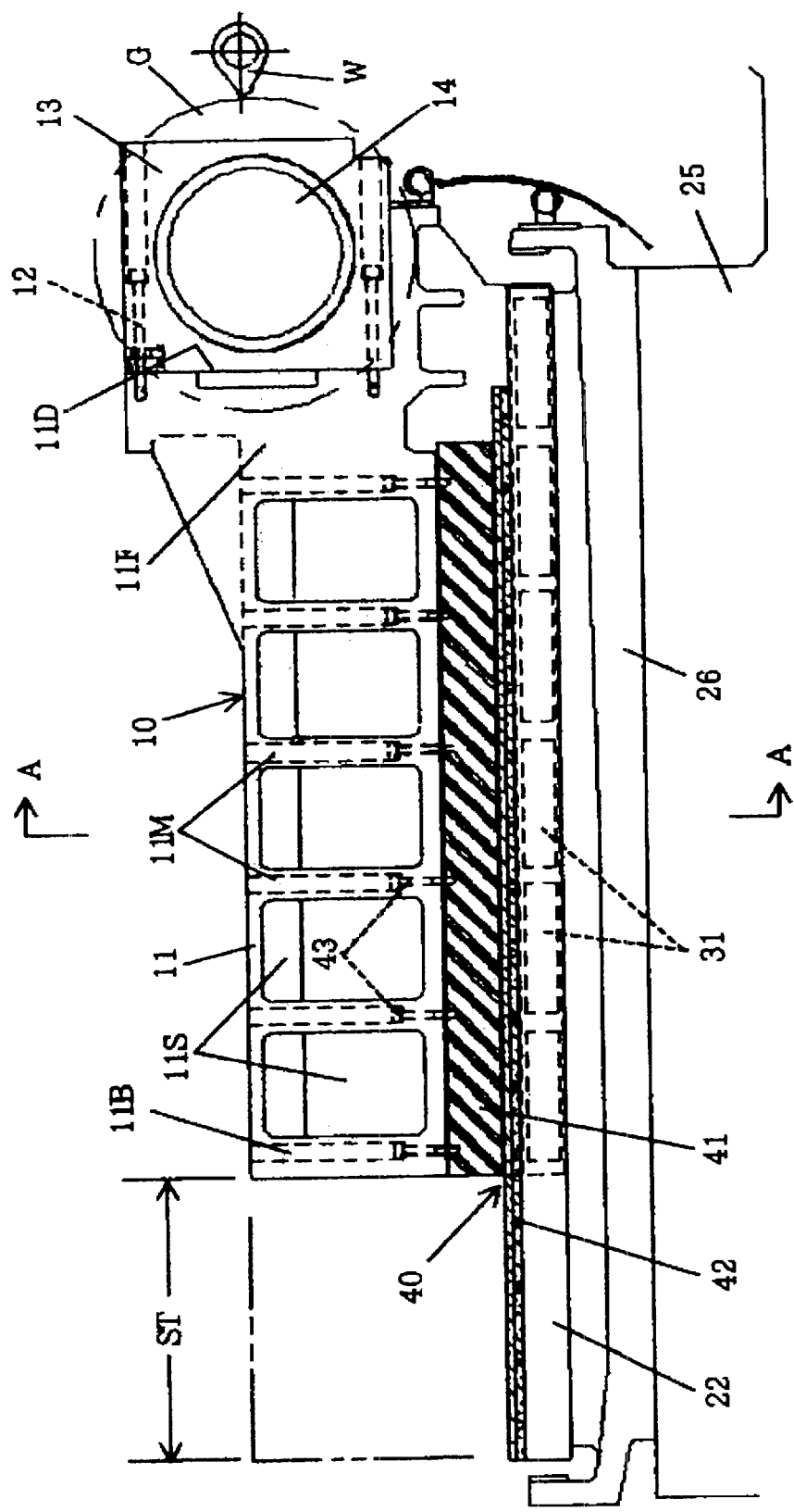
FIG. 1 is a sectional side view of a grinding head guiding apparatus for a grinding machine in a first embodiment of the present invention.

FIG. 1 to FIG. 4 show a grinding head guiding apparatus for a grinding machine as a first embodiment of the present invention. In FIG. 1, a grinding head 10 as a slidable member comprises a main member 11 and a grinding spindle bearing unit 13 which is fixed on an attaching surface 11D formed at a front of the main member 10 by bolts 12. The grinding spindle bearing unit 13 rotatably supports a grinding spindle 14 around a horizontal axis which is perpendicular to a moving direction of the grinding head 10. The grinding spindle 14 is connected to an output shaft of a driving motor (not shown) at one end thereof, and is attached to a grinding wheel G at another end thereof.

As the grinding head 10 is advanced, a cam W of a camshaft as a workpiece, that is rotatably supported by a workpiece supporting apparatus (not shown) including a head stock and a tail stock, is ground by the grinding wheel G.

Figure 2:
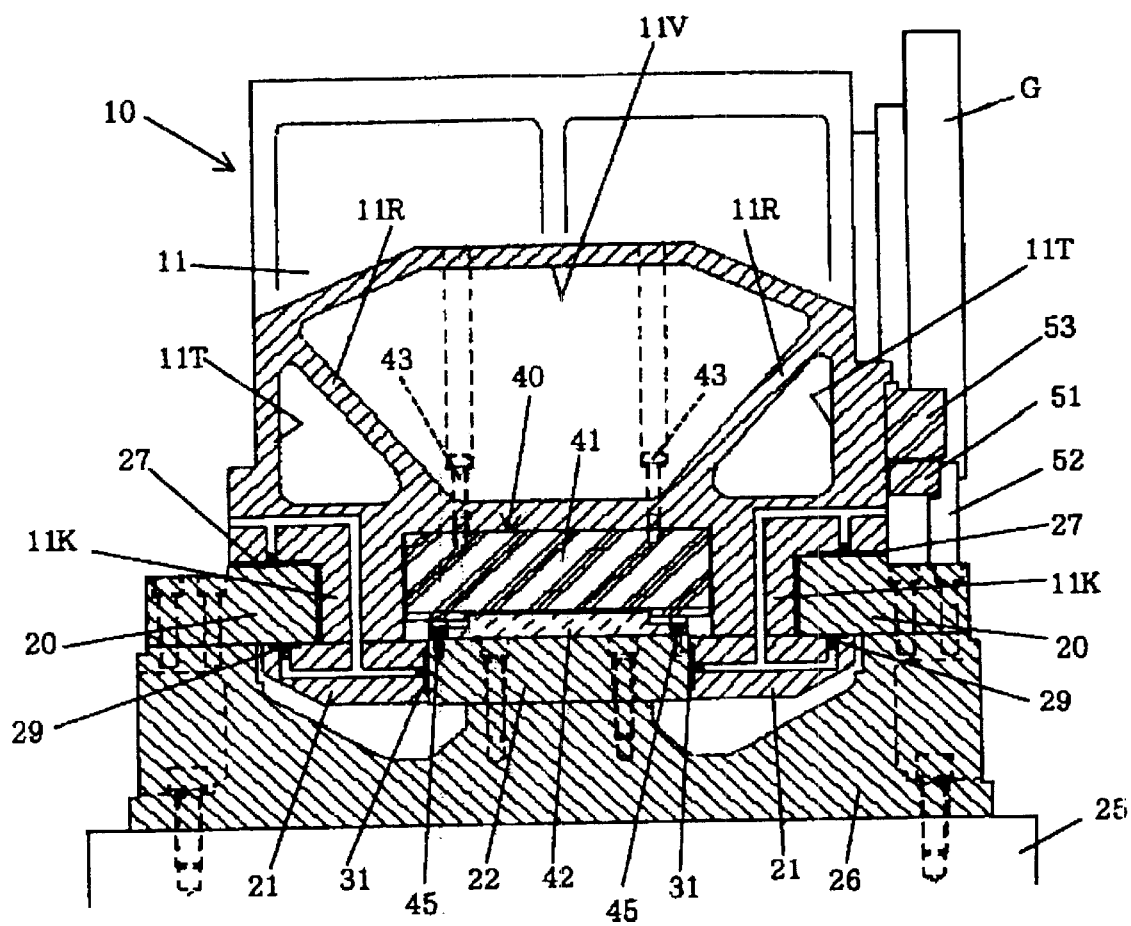
FIG. 2 is a cross-sectional view taken along a line A—A in FIG. 1.

In FIG. 2, the main member 11 is slidably guided on a pair of horizontal guide plates 20 in the form of rectangular shape in a cross section which are arranged away from each other in a horizontal direction perpendicular to the moving direction of the grinding head 10 in parallel. A pair of leg members 11k is formed downwardly at an underside surface of the main member 11. A pair of backside plates 21 is attached to each end portion of the each leg member 11k so as to form a pair of lateral hollow sections through a whole of the longitudinal direction of the grinding head 10. As the guide plates 20 are engaged in the hollow sections each other having a predetermined clearance, the grinding head 10 is guided in a horizontal direction. Each inner surface of the backside plates 21 is opposed to each side surface of a lateral guide plate 22 with a predetermined clearance. Each length of the guide plates 20 and the lateral guide plate 22 are designed to be equal to that adding a longitudinal length of the main member 11 to movable distance ST. And the guide plates 20 are attached to a fixed base 26 by bolts.

Figure 3:
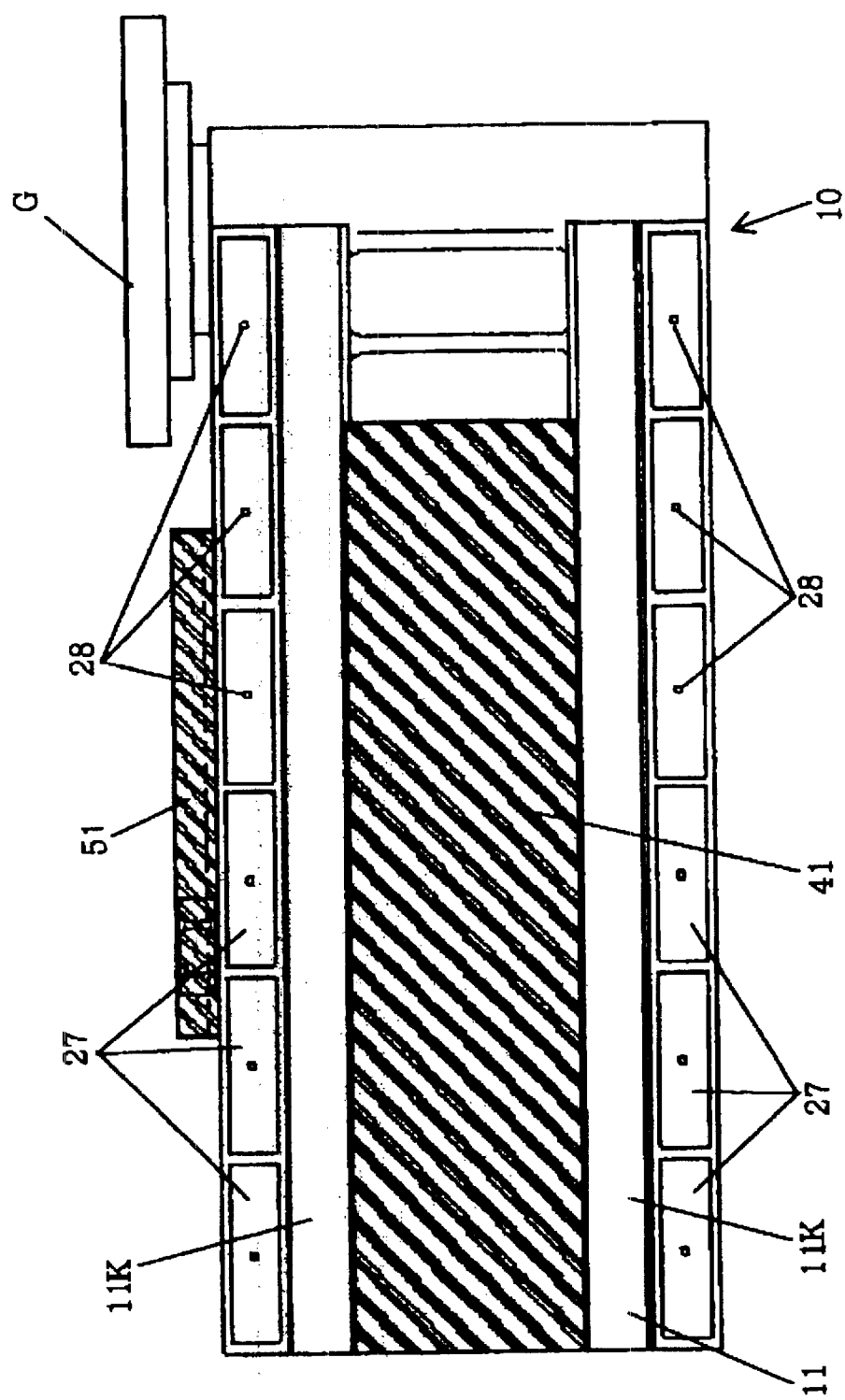
FIG. 3 is a bottom view of a grinding head in the first embodiment of the present invention.

In FIG. 3, a plural number of rectangular hydrostatic pockets 27 are disposed on underside surfaces of the main member 11 along the longitudinal direction, which are opposed to upward surfaces of the horizontal guide plates 20 each other. An orifice 28 supplying pressure oil is disposed in each hydrostatic pocket 27. Similarly, a plural number of rectangular hydrostatic pockets 29 are disposed on upside surfaces of the backside plates 21 along the longitudinal direction, which are opposed to downward surfaces of the horizontal guide plates 20, and an orifice (not shown) supplying pressure oil is disposed in each hydrostatic pocket 29. Hydrostatic pressure generated in the hydrostatic pockets 29 by supplying pressure oil is set so as to cancel a resultant force of hydrostatic pressure for put down the grinding head 10 generated in hydrostatic pockets 27 by supplying pressure oil, magnetic pulling force (after describe) and weight of the grinding head 10.

For setting up the hydrostatic pressure generated in the hydrostatic pockets 29 as above described, in the first embodiment, the hydrostatic pockets 29 are designed narrower than the hydrostatic pockets 27 in a horizontal direction perpendicular to the moving direction of the grinding head 10. As to other ways for different design of the hydrostatic pockets 27 and hydrostatic pockets 29, it can be taken that the hydrostatic pockets 29 are designed shorter than the hydrostatic pockets 27 in the horizontal direction of along the moving direction of the grinding head 10, are designed narrower and shorter, number of hydrostatic pockets 29 are decreased, or size of cross section of the orifices are reduced.

A plural number of rectangular hydrostatic pockets 31 are disposed on inside surfaces of each backside plates 21 along the longitudinal direction, wherein the hydrostatic pockets 31 disposed on left backside plate 21 and right backside plate 21 are configurated symmetrically, and are designed approximately same as a constitution on the hydrostatic pockets 27 as shown in FIG. 3. As pressure oil are supplied to each of hydrostatic pockets 31 through orifices (not shown), the backside plates 21 are positioned with a predetermined distance from each side surface of the lateral guide plate 22 by hydrostatic pressure generated in the hydrostatic pockets 31. Thereby, the main member 11 is movably guided along the lateral guide plate 22.

Besides, the main member 11 is connected to a pressure oil supplying apparatus (not shown) via a flexible hose (not shown) for supplying pressure oil to the hydrostatic pockets 27, 29, 31. In the main member 11 and backside plates 21, oil passages for supplying pressure oil from the flexible hose to the orifice of hydrostatic pockets 27, 29, 31 are formed.

A linear motor 40 is disposed under the main member 11 and constituted of an electromagnetic coil unit 41 (hereinafter "coil unit") as a primary and permanent magnetic plate unit 42 (hereinafter "magnet unit") as a secondary. The coil unit 41 is disposed into a downward hollow formed at a center portion in the lateral direction of an underside surface of the main member 11 along the longitudinal direction of the main member 11, and is fixed to an upside surface of the downward hollow by bolts 43 which are inserted from upside of the main member 11. As shown in FIG. 1 and FIG. 3, the coil unit 41 does not disposed through the whole of the longitudinal direction. That is, although a rear end of the coil unit 41 is extended from a rear end of the main member 11, a front end thereof does not extended by an under portion of the grinding spindle bearing unit 13. FIG. 3 shows that the hydrostatic pockets 27 are disposed even the under portion of the grinding spindle bearing unit 13, but the front end of the coil unit 41 does not reach the under portion of the grinding spindle bearing unit 13.

Since the aforementioned structure of the guiding apparatus as one of the feature of the present invention is taken, the magnetic pulling force of the linear motor 40 is not generated at the under portion of the grinding spindle bearing unit 13. Therefore, all hydrostatic pockets 27 supports the grinding head 10 with approximate same downward force.

The magnet unit 42 is laid on the lateral guide plate 22 along the whole thereof in the moving direction of the grinding head 10 so as to oppose the whole of the coil unit 41 in the longitudinal direction, whichever the grinding head 10 is in most forward position shown by full line in FIG. 1 and most backward position shown by chain line in FIG. 1. A distance between an underside surface of the coil unit 41 and an upside surface of the magnet unit 42 is kept to a predetermined clearance.

As another feature of the present invention, a vertical position opposing the coil unit 41 and the magnet unit 42 is approximately same height as the center position between the upward surface and downward surface of the horizontal guide plates 20 in the vertical direction. Therefore, since the guiding position of the grinding head 10 approximately coincides with a trust force generating position of the linear motor 40 in the vertical direction, moment for causing pitching motion of the grinding head 10 is not generated.

Figure 4:
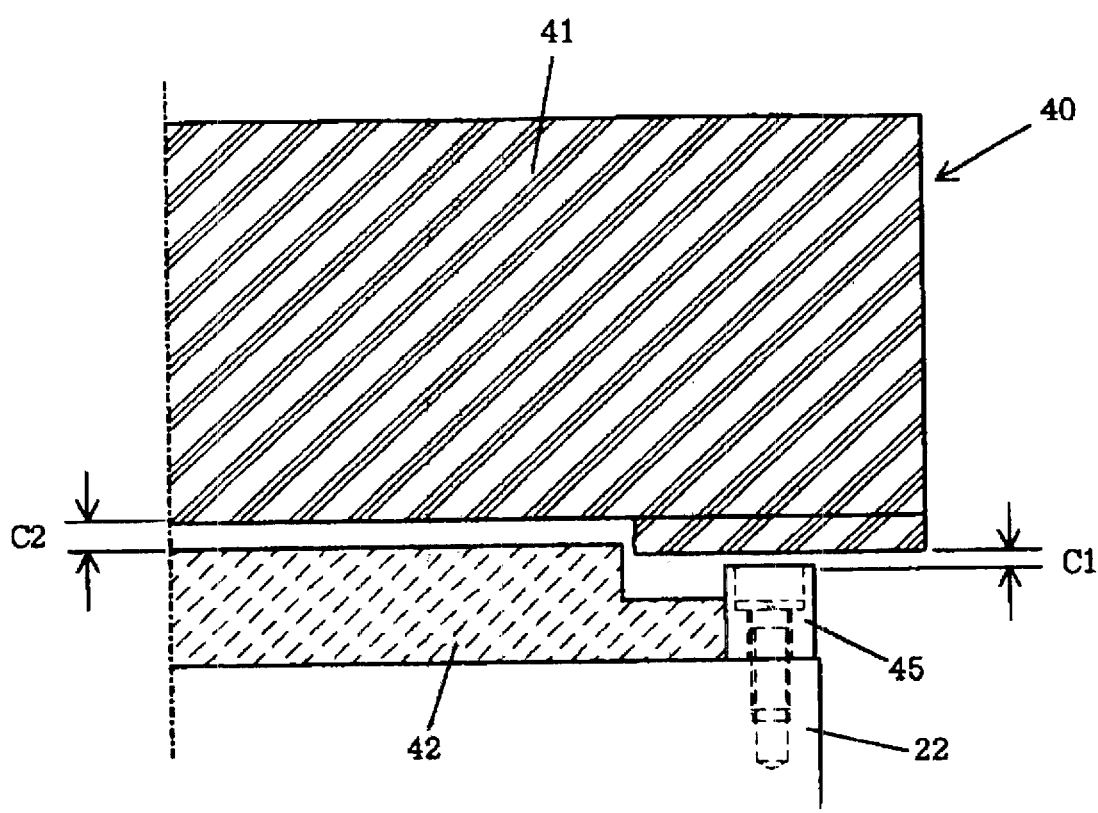
FIG. 4 is a cross-sectional view, on an enlarged scale, of a portion of a linear motor unit in FIG. 2.

As the other feature of the present invention, referring to FIG. 4, a pair of temporary supports members 45 are attached on the lateral guide plate 22 at both sides of the magnet unit 42. The temporary support members 45 work to support temporarily the both sides of the coil unit 41 so as to avoid sticking the coil unit 41 to the magnet unit 42, when the bolts 43 are loosen and the coil unit 41 is detached from the underside surface of the main member 11. Therefore, a height of the temporary supports members 45 is decided so that is narrower a clearance C1 between the temporary members 45 and the coil unit 41 than a clearance C2 between the coil unit 41 and the magnet unit 42.

More suitable, the temporary support members 45 are made of non-magnetic-material such as synthetic resin that has low coefficient of friction, and are designed with same length as the coil unit 41. Hereby, the coil unit 41 can be easily pulled out from rear end of the main member 11 on a condition that is supported on the temporary support members 45, when the coil unit 41 is detached from the underside surface of the main member 11.

For example, in a grinding head guiding apparatus for a cam grinding machine, since the grinding head repeats froward motion and backward motion synchronized with rotation of a cam in a high acceleration, it is requested that the grinding head has both characteristics of a lightweight and a high rigidity. In FIG. 1, the main member 11 is constructed with plural bulkheads 11M along a direction perpendicular to the moving direction of the grinding head 10 and disposed at a same interval distance in the longitudinal direction of the main member 11. And box-shaped spaces 11S are respectively formed between adjacent bulkheads 11M, between a front wall 11F and the bulkhead 11M, and between the bulkhead 11M and a rear wall 11R, so as to improve the lightweight and the high rigidity of the main member 11. The bolts 43, which are used for attaching the coil unit 41 to the underside surface of the main member 11, takes a form of hexagon hollow bolts and, are inserted into through holes formed at the bulkheads 11M, the front wall 11F and the back wall 11B of the main member 11 respectively.

A pair of ribs 11R is formed in each of the box-shaped spaces 11S. The ribs 11R are respectively connected with the front wall 11F and the back wall 11B through the bulkheads 11M along the longitudinal direction of the main member 11. The ribs 11R are extended outwardly from under portion of the main member 11 and connected to upper portion of the main member 11. As to a further feature of the present invention, since the ribs 11R are disposed diagonally, a approximate trapezoid-shaped space 11V is formed in the center of each the box-shaped spaces 11S, and a pair of triangle-shaped spaces 11T are formed at both sides of the trapezoid-shaped space 11V. Exactly, the trapezoid-shaped space 11V is a hexagon-shape like a diamond as shown in FIG. 2, and includes a higher center portion and a pair side portions extended outwardly from the both ends of the higher center portion to upper portions of the ribs 11M.

As an additional feature, the leg members 11k fixed to the backside plates 21 are respectively extended downwardly from under portions forming by the triangle-shaped spaces 11T, and both sides of a portion formed the trapezoid-shaped space 11V are connected to the portions formed the triangle-shaped spaces 11T each other. Therefore, it can be avoided that the portions formed the triangle-shaped spaces 11T are deformed inwardly. In other words, cross sections of the each space are constructed with trusses which two triangle trusses are connected by an intermediate reversed-trapezoid truss (exactly a hexagon truss).

Figure 5:
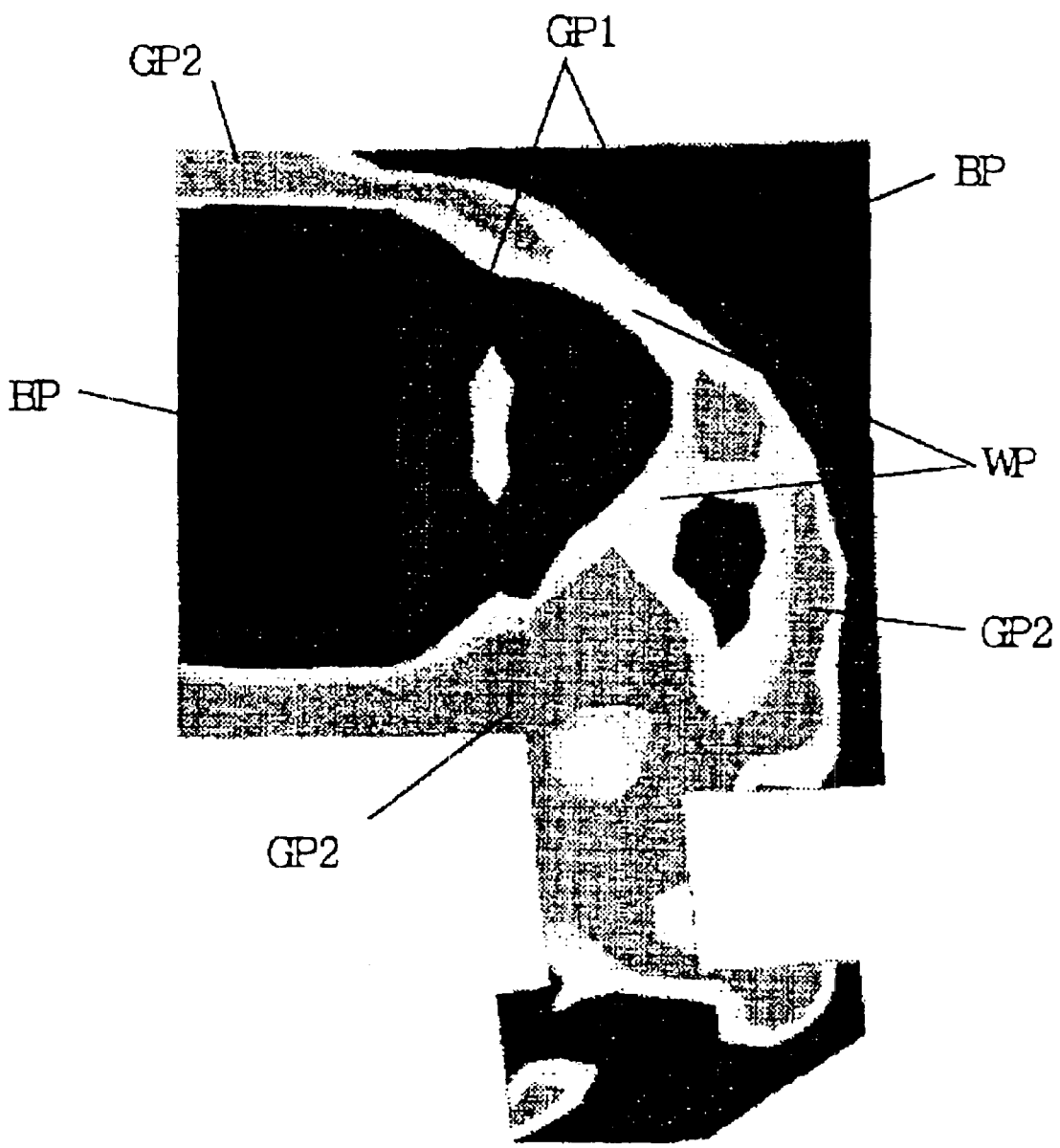
FIG. 5 shows a result of a configuration analysis to a grinding head.

FIG. 5 shows a result of a configuration analysis using a computer. It shows stress distribution at a main member of a grinding head in a condition that a pair of leg members, which formed under the main member, receives separate direction force each other. The main member is a solid model that has no hollow space inside in this analysis. In FIG. 5, it shows clearly to distinguish that little stress portion is represented by black portion BP, some stress portion is represented by dark gray portion GP1, concentrate stress portion is represented by light gray portion GP2, and m concentrate stress portion is represented white portion WP. The cross-sectional shape of the main member 11 shown in FIG. 2 appears the truss construction, which the white portion WP and light gray portion GP2 acting concentrate stress are remained and the black portion BP and the dark gray portion BP1 acting little stress are removed. Therefore, both of the rigidity and lightweight of the main member 11 can be improved.

Further, at one side of the grinding head 10 disposed the grinding wheel 15, a linear scale 51 is attached on the fixed base 26 via a bracket 52 parallel with the horizontal guide plate 20. Above the linear scale 51, a reading head 53 opposed to the linear scale 51 is attached on the main member 11 through a small clearance with the linear scale 51. The reading head 53 detects scale information of the linear scale 51 as position date of the grinding head 10 in the moving direction, and inputs the position date to a computerized numerical controller (not shown, hereinafter "CNC").

An operation of the aforementioned first embodiment will be described hereinafter. When electric current is given to the coil unit 41 in response to a signal from the CNC, the coil unit 41 develops thrust in cooperation with the magnet unit 42. Therefore, the grinding head 10 is moved by the thrust. Then, a current position of the grinding head 10 is detected by the reading head 53, and a signal indicating the current position is sent to the CNC as a feed-back signal. The CNC controls the grinding head 10 so as to makes the feed-backed signal to coincide with an objective position.

In the moving operation, the grinding head 10 is guided by the horizontal guide plates 20 in the horizontal direction. The grinding head 10 is moved smoothly with floating relative to the horizontal guide plates 20 by hydrostatic pressure generated in the hydrostatic pockets 27 which are opposed to the upward guiding surface of the each horizontal guide plate 20 and in the hydrostatic pocket 29 which are opposed to the downward surface of the each horizontal guide plate 20. Then, since the hydrostatic pressure is generated in the hydrostatic pockets 31 which are opposed to the each side surface of the lateral guide plate 22, the grinding head 10 is moved smoothly through the lateral guide plate 22 having the small clearance with the each side surface of the lateral guide plate 22.

Because the thrust of the liner motor 40 is developed at approximate same height as the center portion of the horizontal guide plates 20, the moment causing the pitching motion of the grinding head 10 can be reduced or eliminated.

Magnetic pulling force generated by the coil unit 41 and the magnet unit 42 pulls the grinding head 10 to the fixed base 26. In addition to the magnetic pulling force, the weight of the grinding head 10 and hydrostatic pressure generated at the hydrostatic pockets 29 opened toward the upward surface of the horizontal guide plates 20 act on pull the grinding head 10 to the fixed base 26. Upward hydrostatic pressure generated at the hydrostatic pockets 27 opened toward the upward guiding surface of the horizontal guide plates 20 balanced with downward force which is resultant of the magnetic pulling force, the weight of the grinding head 10, and the hydrostatic pressure of the hydrostatic pockets 29.

Since the coil unit 41 is not disposed under the grinding spindle bearing unit 13 attached at the front end of the grinding head 10, action of the weight of the grinding spindle bearing unit 13 to the horizontal guide plates 20 avoided. Therefore, since lopsided downward force dose not act on the front portion of the grinding head 10, the movement of the grinding head 10 becomes smoother. And at any positions along the longitudinal direction of the grinding head 10, approximately equal downward force acts on the horizontal guide plates 20. Therefore, all the hydrostatic pockets 27 or all hydrostatic pockets 29 forward to the horizontal guide plates 20 can be same constructed with same structure.

The resultant force of the magnetic pulling force and the weight of the grinding head 10 acts on the pair of leg members 11k to separate each other. For opposing to the separating direction force, the ribs 11R are disposed and the leg members 11k are supported by the portions constructing the triangle-shaped spaces 11T, i.e., the triangle truss. Especially, since the portions constructing right and left triangle-shaped spaces 11T are connected by the portion constructing trapezoid-spaced space 11V, top portions of the portions constructing the triangle-shaped spaces 11T are not deformed toward inside, and deformation of the leg members 11k toward separating direction is avoided surly. Therefore, the grinding head 10 is guided in a desired high accuracy along the horizontal guide plates 20.

When the coil unit 41 is maintained or exchanged, the coil unit 41 is detached from the grinding head 10. Then a hexagon wrench is inserted into the holes formed on the bulkhead 11M, the front wall 11F and the rear wall 11B of the main member 11, and bolts 43 are loosen. When the bolts 43 are detached, the coil unit 41 makes to stick to the magnet unit 42. Since both ends the coil unit 41 in the lateral direction are supported by temporary support members 45, the coil unit 41 dose not stick to the magnet unit 42. Therefore, the coil unit 41 can be easily pulled out from the rear end of the main member 11, and the coil unit 41 finishing the maintenance or a spare coil unit are attached to the underside surface of the main member 11 by reverse order of the aforementioned detaching method.

Figure 6:
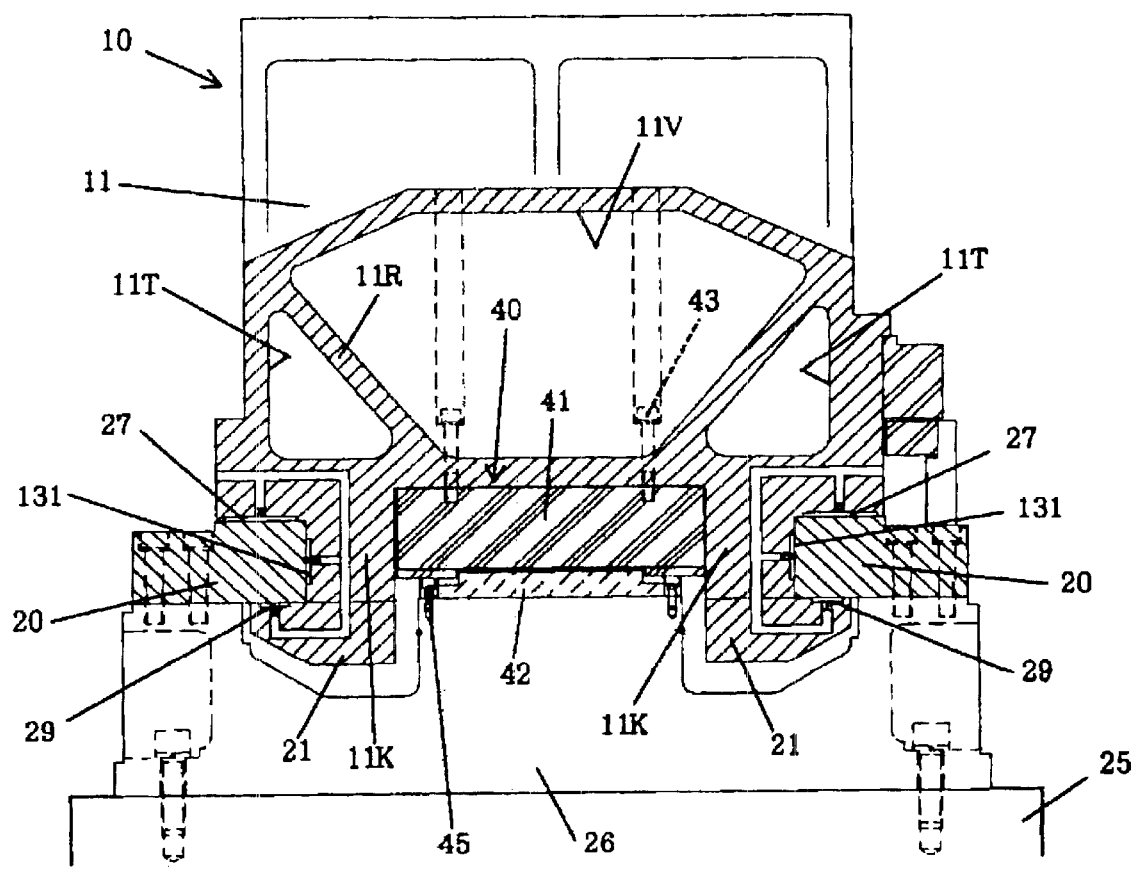
FIG. 6 is a cross-sectional view of anther grinding head guiding apparatus for a grinding machine in a second embodiment of the present invention.

FIG. 6 shows the second embodiment of the present invention. As understood clearly in comparison with the aforementioned first embodiment, in the second embodiment, the lateral guide plate 22 is excluded from the first embodiment and the horizontal guide plates 20 operate for lateral guiding function instead of the lateral guide plate 22. Particularly, inside surfaces of the horizontal guide plates 20 are opposed to outside surfaces of the leg members 11k by a predetermined clearance. A plural number of hydrostatic pockets 131, 131 are formed on the each outside surface of the leg members 11k. The hydrostatic pockets 131, 131 are constructed and arranged similar to the hydrostatic pockets 31 formed on the inside surfaces of the backside plates 21 in the first embodiment. The other constructions of the second embodiment are same as that of the first embodiment. Besides, the magnet unit 42 is attached directly on fixed base 26 in the second embodiment.

Since the second embodiment is constructed as above described, it becomes approximately same height that the center of the horizontal direction guiding position which are constructed by the hydrostatic pockets 27, 29 opened forward the upward guiding surface and downside guiding surface of the horizontal guide plates 20, the center of a lateral direction guiding position, and trust force developing position of the linear motor 40. Therefore, the grinding head 10 is moved smoothly without occurrence of pitching motion and yawing motion.

In the both embodiments, the grinding head guiding apparatus for the grinding machine is described as the slidable member guiding apparatus of the present invention. However, a movable member guided by the guiding apparatus of the present invention can be applied a tool head of a lathe or a machining center which supports a cutting tool, or a work table of which supports a workpiece.

In the both embodiments, the horizontal guide plates 20 are inserted between the main member 11 and backside plates 21 from inside, however it can be applied such a construction that the main member 11 and backside plates 21 hold the horizontal guide plates 21 from outside. Further, it can be applied such as a construction that the horizontal guide plates 20 are not guided at the downward surface thereof and that the backside plates 21 are excluded.

Furthermore, the bulkheads 11M do not necessarily formed in the main member 11. It can be applied such a construction that the bulkheads 11M are excluded and the ribs 11R are arranged between the front wall 11F and rear wall 11B through the longitudinal direction of the main member 11.

Obviously, numerous modifications and variations of the present invention are possible in light of the above teachings. It is therefore to be understood that within the scope of the appended claims, the present invention may be practiced otherwise than as specifically described herein.

What is claimed is:

1. A guiding apparatus for a slidable member driven by a linear motor, comprising:
   a base;
   a pair of horizontal guide members fixed on the base along a longitudinal direction thereof and guiding the slidable member;
   a primary portion of a linear motor and attached on a lower surface of the slidable member; and
   a secondary portion of a linear motor and attached on an upper surface of the base along the longitudinal direction thereof; wherein
      a vertical position of a portion opposing the primary portion and the secondary portion is approximately the same as a vertical position of the horizontal guide members guiding the slidable member, wherein:
      each of the horizontal guide members has an upper guiding surface and a lower guiding surface; and
      the vertical position of the portion opposing the primary portion and the secondary portion is between a vertical position of the upper guiding surface and a vertical position of the lower guiding surface.

2. A guiding apparatus for a slidable member driven by a linear motor, comprising:
   a base;
   a pair of horizontal guide members fixed on the base along the longitudinal direction thereof and guiding the slidable member;
   a primary portion of a linear motor and attached on a lower surface of the slidable member;
   a secondary portion of a linear motor and attached on an upper surface of the base along the longitudinal direction thereof; and
   a pair of temporary support members attached on the base at both sides of the secondary portion along the longitudinal direction thereof, which support the primary portion so as to avoid the primary portion sticking to the secondary portion when the primary portion is detached from the slidable member, wherein:
      a clearance between a lower surface of the primary portion and upper surfaces of the temporary support members is narrower than a clearance between the lower surface of the primary portion and an upper surface of the secondary portion.

3. A guiding apparatus for a slidable member driven by a linear motor according to claim 2, wherein:
   the primary portion is attached on the slidable member by at least one attaching member which can be operated from above the slidable member for attaching or detaching the primary portion.

4. A guiding apparatus for a slidable member driven by a linear motor, comprising:
   a base having a grinding spindle bearing unit;
   a pair of horizontal guide members fixed on the base along the longitudinal direction thereof and guiding the slidable member;
   a supporting unit attached on a front end of the sliding member;
   a primary portion of a linear motor and attached on a lower surface of the slidable member except at an under portion attached on the grinding spindle bearing unit;
   a secondary portion of the linear motor and attached on an upper surface of the base along the longitudinal direction thereof.

5. A guiding apparatus for a slidable member driven by a linear motor, wherein the support unit supports one of a tool or a workpiece.

6. A guiding apparatus for a slidable member driven by a linear motor, comprising:
   a base;
   a pair of horizontal guide members fixed on the base along the longitudinal direction thereof and guiding the slidable member;
   a primary portion of a linear motor and attached on a lower surf ace of the slidable member along the longitudinal direction thereof; and
   a secondary portion of the linear motor and attached on an upper surface of the base along the longitudinal direction thereof; wherein
      the slidable member has a pair of ribs extending along the longitudinal direction of the slidable member therein, which ribs define an approximately trapezoid-shaped space disposed at a center of the slidable member in the lateral direction, and a pair of triangle-shaped spaces disposed at both sides of the trapezoid-shaped space.

7. A guiding apparatus for a slidable member driven by a linear motor according to claim 6, wherein:
   the slidable member has a pair of leg members formed under portions disposed at the triangle-shaped spaces and extending downwardly; and
   outside surfaces of the leg members oppose inside surfaces of the horizontal guide members.

8. A guiding apparatus for a slidable member driven by a linear motor according to claim 7, comprising:
   a pair of backside plates attached on the leg members; and
   a lateral guide plate fixed between the base and the secondary portion along the longitudinal direction of the base; wherein
      outside surfaces of the lateral guide plate guide oppose inside surfaces of the backside plates.

9. A guiding apparatus for a slidable member driven by a linear motor according to claim 8, wherein:
   a vertical position of a portion opposing the primary portion and the secondary portion is approximately the same as a vertical position of the horizontal guide members guiding the slidable member.

10. A guiding apparatus for a slidable member driven by a linear motor according to claim 9, wherein:
    each of the horizontal guide plates has an upper guiding surface and a lower guiding surface, and
    a part of the lower surface of the slidable member opposes each of the upper guiding surfaces, and each upper surface of the backside plates opposes each of the lower guiding surfaces.

11. A guiding apparatus for a slidable member driven by a linear motor according to claim 10, wherein:
    the vertical position of the portion opposing the primary portion and the secondary portion is between a vertical position of the upper guiding surface and a vertical position of the lower guiding surface.

12. A guiding apparatus for a slidable member driven by a linear motor according to claim 7, wherein:
    the inside surfaces of the horizontal guide member guide oppose outside surfaces of leg members.

13. A guiding apparatus for a slidable member driven by a linear motor according to claim 12, wherein:
    a vertical position of a portion opposing the primary portion and the secondary portion is approximately the same as a vertical position of the horizontal guide members guiding the slidable member.

14. A guiding apparatus for a slidable member driven by a linear motor according to claim 13, comprising:
    a pair of backside plates attached on the leg members; wherein
       each of the horizontal guide plates has an upper guiding surface and a lower guiding surface; and
       a part of the lower surface of the slidable member opposes to each of the upper guiding surfaces, and each upper surface of the backside plates opposes each of the lower guiding surfaces.

15. A guiding apparatus for a slidable member driven by a linear motor according to claim 14, wherein:
    the vertical position of the portion opposing the primary portion and the secondary portion is between a vertical position of the upper guiding surface and a vertical position of the lower guiding surface; and
    a vertical position of the horizontal guide plate guiding the leg members is between a vertical position of the upper guiding surface and a vertical position of the lower guiding surface.

16. A guiding apparatus for a slidable member driven by a linear motor according to one of claims 1, 2–3 and 6–15, wherein:
    the slidable member supports one of a tool or a workpiece.

17. A guiding apparatus for a slidable member driven by a linear motor according to any one of claims 1, 2, and 3–15, wherein:
    the slidable member is guided by hydrostatic pressure.

* * * * *